(12) United States Patent
Singh (10) Patent No.: US 10,089,851 B1
(45) Date of Patent: Oct. 2, 2018

(54) GLASS BREAK DETECTOR

(71) Applicant: Nortek Security & Control LLC, Carlsbad, CA (US)

(72) Inventor: Inderjit Singh, San Diego, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 0 days.

(21) Appl. No.: 15/471,769

(22) Filed: Mar. 28, 2017

(51) Int. Cl.
| | |
|---|---|
| *G08B 1/08* | (2006.01) |
| *H04M 11/04* | (2006.01) |
| *H04Q 1/30* | (2006.01) |
| *G08B 21/18* | (2006.01) |
| *H02S 40/38* | (2014.01) |
| *G08B 13/16* | (2006.01) |
| *G08B 13/04* | (2006.01) |
| *H04W 4/00* | (2018.01) |
| *H02J 7/35* | (2006.01) |
| *H04W 4/80* | (2018.01) |

(52) U.S. Cl.
CPC .......... *G08B 21/182* (2013.01); *G08B 13/04* (2013.01); *G08B 13/1672* (2013.01); *H02S 40/38* (2014.12); *H02J 7/35* (2013.01); *H04W 4/008* (2013.01); *H04W 4/80* (2018.02)

(58) Field of Classification Search
CPC ... G08B 21/182; G08B 13/04; G08B 13/1672
USPC ........................................................ 340/533
See application file for complete search history.

(56) References Cited

U.S. PATENT DOCUMENTS

| | | | | |
|---|---|---|---|---|
| 3,634,845 A | * | 1/1972 | Colman | G08B 13/04 200/61.62 |
| 4,668,941 A | * | 5/1987 | Davenport | G08B 13/04 340/550 |
| 4,853,677 A | * | 8/1989 | Yarbrough | G08B 13/04 340/544 |
| 5,552,770 A | * | 9/1996 | McMaster | G08B 13/04 340/541 |
| 6,538,570 B1 | * | 3/2003 | Smith | G08B 13/04 340/550 |
| 7,388,487 B2 | * | 6/2008 | Smith | G08B 13/04 340/426.27 |
| 8,810,397 B2 | * | 8/2014 | Wieser | G08B 13/08 340/541 |
| 2006/0271695 A1 | * | 11/2006 | Lavian | G06F 21/552 709/229 |

* cited by examiner

*Primary Examiner* — John A Tweel, Jr.
(74) *Attorney, Agent, or Firm* — Schwegman Lundberg & Woessner, P.A.

(57) ABSTRACT

A glass break sensor can optionally include a sensor unit sized and shaped to fit between panes of a glass, such as in a multi-pane window. The sensor unit can optionally include a sensor, a glass break detector circuit configured to input from the sensor and declare a glass break event when specified criteria are satisfied, and a wake-up circuit configured to detect a wake-up event and wake up the glass break detector circuit when one or more wake up criteria are satisfied. A glass break detector assembly can optionally include a first pane, a second pane and a glass break sensor between the first pane and the second pane.

21 Claims, 5 Drawing Sheets

GLASS BREAK DETECTOR

BACKGROUND

Glass break events can be detected for a variety of reasons. For example, unauthorized entry into a home or other building can sometimes be detected with a window break detector that is triggered when an unauthorized entrant breaks a glass window to gain access to a building.

Reliability can be a problem with intrusion sensors such as window glass break sensors. False alarms can be disruptive and costly, as responses to window break alarms can range from occupant response to an auditory alarm to automated calls to police or other authorities.

OVERVIEW

The present inventors have recognized, among other things, that a problem to be solved can include the construction of a reliable and power efficient glass break sensor that detects glass break events with minimal false alarm events. The present subject matter can help provide a solution to this problem, such as by inserting or integrating sensor components between panes of a window or other multi-pane glass object.

An example glass break detector assembly (Example 1) can include a first pane, a second pane, and, a glass break sensor between the first pane and the second pane.

In Example 2, the glass break detector assembly of Example 1 can optionally include a wake-up circuit configured to process input from the glass break sensor and initiate a detector circuit when one or more specified wake-up criteria are satisfied.

In Example 3, the glass break detector assembly of Example 1 or 2 can optionally include the one or more specified wake-up criteria include detection of a sound that has a frequency within a specified frequency range and has an amplitude that exceeds a threshold.

In Example 4, the subject matter of any one or any combination of Examples 1-3, can optionally be configured such that the one or more specified wake-up criteria include detection of an acceleration.

In Example 5, the subject matter of any one or any combination of Examples 1-4 can optionally be configured such that the one or more specified wake-up criteria include detection of a pressure change.

In Example 6, the subject matter of any one or any combination of Example 1-5 can optionally be configured to include a detector circuit configured to declare a glass break event when one or more glass-break criteria are satisfied.

In Example 7, the subject matter of any one or any combination of Examples 1-6 can optionally be configured such that the glass break sensor includes a sound detector and the one or more glass-break criteria include a first sound having a first frequency within a first frequency range and an amplitude exceeding a first threshold, followed by a second sound having a second frequency range and an amplitude exceeding a second threshold.

In Example 8, the subject matter of any one or any combination of Examples 1-7 can optionally be configured such that the second frequency range is higher than the first frequency range. In an example, the first sound is a thud, which can suggest a blunt impact, and the second sound is a shrill sound, which suggest that glass is breaking or falling.

In Example 9, the subject matter of one or more of Examples 1-8 can optionally be configured such that the glass break sensor further includes a pressure sensor. The one or more glass-break criteria can include a pressure change that exceeds a threshold.

In Example 10, the subject matter of any one or any combination Examples 1-7 can optionally be configured such that the glass break sensor further includes an accelerometer, and the one or more glass-break criteria further include an acceleration that exceeds a threshold. In various examples, pressure information, acceleration information, or both, can be used as a primary glass-break sensor, by a wake-up circuit to activate a sound sensor or other sensors, or by a wake-up circuit for confirmation of an wake-up event detected by other sensors, or by a glass break detection circuit for confirmation or fusion with other glass-break sensors (e.g. to complement or confirm acoustic sensor.)

In Example 11, the subject matter of any one or any combination of Examples 1-10 can further include a solar cell and a rechargeable battery coupled to the solar cell and configured to power the detector circuit.

In Example 12, the subject matter of any one or any combination of Examples 1-11 can further include a battery bay configured to receive one or more batteries. The battery bay can be electrically coupled to the detector circuit and configured to power the detector circuit.

In Example 13, the subject matter of any one or any combination of Examples 1-14 can optionally include a communication circuit configured to communicate glass break information over a wireless network. In various examples, the wireless circuit can be configured to communicate with a panel, hub, or a mobile device such as a tablet or phone over a local wireless network, such as a WiFi, Zigbee, Zwave, Thread, or Bluetooth network, or over a longer distance network such as a cellular network or satellite network. In an example, a glass break sensor assembly is combined or integrated with a door open sensor. In an example, a glass break sensor assembly is configured to communicate with a controller that is configured to auto-lock doors or other objects when a glass break is detected, or turn on cameras or other sensors, or sound a speaker or other alert when a glass break is detected.

In Example 14, the subject matter of any one or any combination of Examples 1-13 can optionally be configured such that the first pane and second pane are part of a microwave oven, and the glass break detector is configured to detect an event in the microwave oven.

A glass break detector (Example 15) can include a sensor unit sized and shaped to fit between panes of glass, for example between panes of a glass window. The sensor unit can include a sensor, a glass break detector circuit configured to receive input from the sensor and declare a glass break event when specified criteria are satisfied, and a wake-up circuit configured to detect a wake-up event and wake up the glass break detector circuit when one or more wake up criteria are satisfied.

In Example 16, the subject matter of Example 15 can optionally be configured such that the sensor is an acoustic sensor. The sensor unit can optionally be configured to also include a pressure sensor. The glass break detector circuit can optionally be configured to declare a glass break event using both sound information from the acoustic sensor and pressure information from the pressure sensor.

In Example 17, the subject matter of Examples 15-16 can optionally be configured such that the sensor unit further includes a rechargeable battery configured to power the glass break detector circuit and the wake-up circuit. In some examples, a solar cell configured to charge the rechargeable battery can also be included.

In Example 18, the subject matter of any one or any combination of Examples 15-18 can optionally be configured to include a lower-power communication circuit configured to communicate a glass break event over a wireless network.

Detecting a glass break event (Example 19, e.g., a method, or a circuit executing instructions, or instructions embedded on a computer readable medium) can include sensing acoustic information between panes of glass using an acoustic sensor circuit, evaluating the acoustic information using an evaluation circuit, and declaring a glass break event (such as a window break event) when the acoustic information satisfies one or more specified criteria.

In Example 20, the subject matter of Example 19 can optionally include evaluating the acoustic information includes monitoring for a first event that satisfies one or more wake-up criteria, and when the one or more wake-up criteria are satisfied, evaluating the acoustic information for a second event that satisfies one or more glass-break criteria.

In Example 21, the subject matter of Example 19 or 20 can include sensing pressure information between the panes of glass using a pressure sensing circuit, and waking up the sensor circuit when the pressure information satisfied specified pressure criteria.

In Example 22, the subject matter of any one or any combination of Examples 19-21 can optionally include sensing pressure information between the panes of glass using a pressure sensing circuit, and evaluating the acoustic information can optionally include evaluating the pressure information in combination with the acoustic information to determine whether to declare a glass break event.

An example (e.g., "Example 23") of subject matter (e.g., a system or apparatus) can optionally combine any portion or combination of any portion of any one or any combination of Examples 1-22 to include "means for" performing any portion of any one or any combination of the functions or methods of Examples 1-23, or a "machine-readable medium" (e.g., massed, non-transitory, etc.) including instructions that, when performed by a machine, cause the machine to perform any portion of any one or any combination of the functions or methods of Examples 1-23.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

A glass break detector can be constructed by placing one or more sensors between the panes of glass, such as between panes of a multi-pane window. This space between the glass panes in a window or other object provides an opportunity to increase the reliability of detection and by filtering out random noises or loud music and other types of sounds that can be false-detected as a glass breaks. This filtering effect by the glass panes can enable more accuracy of detection, longer battery life, or both.

In various examples, a sensor for a glass break detector can be placed between glass panes that can filter or otherwise reduce ambient environmental conditions, such as ambient sound or pressure variations. Glass and plastic, and acrylics (e.g., Plexiglass™), for example, are natural filters for sound, pressure, and sometimes light. This reduction of ambient stimulus can increase the specificity of a glass break detector: For example, when a sensor is placed between panes of glass, an ambient sound or vibration will be reduced in magnitude. Considering a glass break event as a signal and ambient sounds as "noise", the placement of a sensor between panes of glass can provide a higher signal to noise ratio at the sensor, which can result in higher sensitivity, specificity, or both, in detecting a glass break event. In addition, the reduced occurrence of wake-up events can lead to longer battery life due to less frequent activation of a glass detection circuit or process.

One or more circuits can be used to monitor and declare a glass break event. The one or more sensing circuits can include, for example, an acoustic (sound) sensor, a barometric (pressure) sensor, an accelerometer, a magnetometer, or other sensors. In some examples, a low-power wake-up circuit is configured to detect a wake-up event that indicates that a glass break event might be occurring, such as a sudden change in pressure, or an acceleration, and initiate action (e.g., gathering and processing of sensor data) by one or more sensors circuits or a detector circuit. The detector circuit can be configured to declare a glass break event when one or more glass-break criteria are satisfied. In other examples, a single processor both monitors for a wake-up event, which can trigger more power intensive processing to assess whether a glass break event has been detected by a sensor or combination of sensors.

A glass break event can be detected by the glass break circuit using information from a sensor or a combination of sensors, based on one or more predetermined glass break criteria. The glass break criteria can include a sound that has a frequency within a specified frequency range and has an amplitude that exceeds a threshold. The glass break criteria can also include a sudden change in barometric pressure, which can occur as a result of an impact on a glass pane (compressing gas between panes) or as a result of a fracture of a glass pane. The glass break criteria can also include a shift in the wavelength or amplitude of light, which can be caused by damage to a pane of glass or activity near the pane window. The glass break criteria can also include a shift in a detected magnetic field, which can indicate movement with respect to the earth's magnetic field, or movement with respect to a magnet, such as a magnet that is installed as part of a security system. The glass break criteria can also include an acceleration (which can indicate movement of the window or an object (e.g. door) to which the glass pane is attached. Acceleration can be detected using an accelerometer.

In some examples, the glass break criteria can include a sequence of events. In an example, the glass break criteria can include the detection of a first sound having a first frequency within a first frequency range and an amplitude exceeding a first threshold, followed by detection of a second sound having a second frequency range and an amplitude exceeding a second threshold. For example, the glass break criteria can include a dull "thud" sound (which can be indicative of blunt impact) followed by a shrill sound (which can be indicative of a glass pane shattering). This dull-shrill sequence can be detected, for example, by defining a first frequency range detection threshold, and a second frequency detection threshold that is higher than a first frequency range detection threshold, and monitoring for the detections to occur in sequence (i.e. first, then second.) In some examples, a glass break detector is configured to wake-up, detect, and verify a "thud", followed by confirmation of a break using an acoustic sensor and a circuit that processes the sound information from the acoustic sensor. This implementation can provide desirable reliability characteristics.

In some examples, the glass break criteria can be selected as a function of the material or size of a window or other pane of glass. For example, a large window breaking will sound different than a small window. The glass break criteria can account for this difference by defining criteria that include time (duration of sound), frequency, rate of change of sound, amplitude, or other characteristics.

In a multi-sensor example, the glass break criteria can include a shift in barometric pressure coupled with (i.e. shortly before or after or coincident with) a sound or combination or sequence of sounds. In some examples, information from a barometer or accelerometer can be used to confirm a wake-up event detected by an acoustic sensor.

In an example, a first sensor can be used to assess one or more primary glass-break criteria, and a second sensor can be used to assess one or more secondary glass break criteria that are used to confirm a glass break event when the first glass-break criteria are satisfied. In an example, pressure or acceleration or both can be used as a primary glass-break criteria, and acoustic information is used to confirm an event detected using the primary glass-break criteria. In another example, acoustic information is used as primary glass-break criteria, and pressure or acceleration or both are used to confirm a detected glass-break event. In other examples, a suite of sensors can be used together ("sensor fusion") to detect a glass break event using criteria that involves detection through multiple sensors in predetermined periods of time or sequences and exceeding predetermined thresholds.

The detector circuit can be configured to declare a glass break event when one or more glass-break criteria are satisfied, and communicate the glass break event by sending a wired or wireless communication signal, emitting a sound or light, or otherwise sending a signal. In some examples, the glass break detector circuit can send a signal, or trigger action by a system, to take some action such as sending a message through a network (e.g., through the internet), auto-locking doors or other physical assets, turning on a camera, or sounding speaker or speaker system to send an alarm or send a message (e.g., "intruder" or "you have been detected").

The glass break detector can be configured into any object that includes a plurality of glass panes, such as a glass window in a home or other building, or an apparatus such as a microwave oven. Due to the small size of sensors, the glass break detect can be hidden on the edge of a pane so as to be cosmetically attractive, or not visible to a thief who otherwise might try to avoid or disable the sensor.

Figure 1:
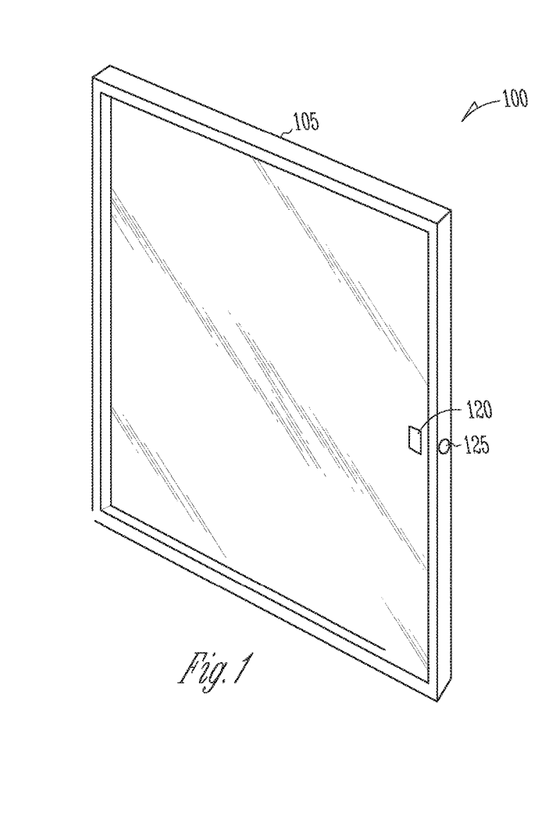
FIG. 1 is a perspective illustration of an example assembly that includes two or more glass panes and a glass break detector.
Figure 2:
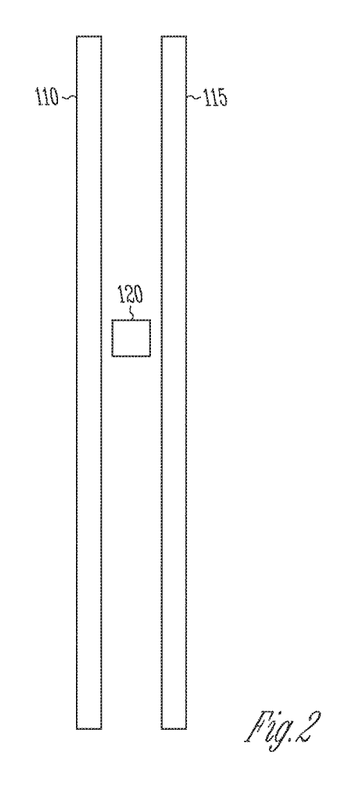
FIG. 2 is a cross-sectional view of the glass panes and glass break detector shown in FIG. 1.

An illustration of an example glass break glass assembly is provided in FIGS. 1 and 2. FIG. 1 is a perspective illustration that shows an assembly 100 that includes a frame 105 and two or more glass panes 110, 115. A cross-sectional view is provided in FIG. 2. A glass break detector 120 can be placed between the glass panes 110, 115. The placement between the panes can be advantageous because the panes filter out physical phenomenon such as sound, pressure waves, and, in some instances wavelengths of light, especially when one or more of the glass panes are tinted. The glass break detector 120 can detect a glass break event using information from one or more physical sensors, such as an acoustic sensor, barometric sensor, light sensor, accelerometer, or magnetometer.

In some examples, a glass break detector can be manufactured into a glass by placing the glass break detector, or a sensor component of the glass break detector, between window planes as the window is assembled. In some examples, a portion of the window break detector, such as a battery bay, can be built into or onto the frame (or some other component) of the window, as opposed to placement between glass. For example, a system can be configured with a replaceable battery situated in a battery bay that is accessible from an inside of the window.

In other examples, a pre-existing window can be retrofit with a glass break sensor by drilling a hole 125 or slot in the window frame to allow for insertion of the window break detector, or a sensor component thereof, into the space between two panes. For example a ¼ inch by 1 inch (6 mm×25 mm) slot can be formed to enable insertion of a glass break sensor into the window. Smaller sizes and other form factors are also possible. The hole can be sealed with a plug and a rubber adhesive. A desiccant can be provided to neutralize any water content that enters the space between the window panes.

While the illustrations show a two-pane assembly, an assembly that includes three or more glass panes is also possible. A glass break detector 120, or portion thereof (e.g. sensor circuit) can, for example, be placed between an outer pane and a pane adjacent to the outer pane (e.g., the between the outer and middle pane in a 3-pane window), to detect an impact or fracture at the outer pane. A sensor adjacent an outer pane can be more sensitive than a sensor on an inner pane of a three-pane window, due for example to more immediate proximity to the first pane to break (when intrusion occurs from outside) or a pressure spike in the space between the outer and middle pane. In another example, a glass break detector (or portion thereof, e.g. a sensor circuit) can be placed between an inside pane and an adjacent pane, which can reduce false alarms that can occur when an object, such as a tree branch, bird, or other object, hits an outside pane of a window. In some examples, multiple glass break sensors can be used. For example, in a three-pane window, a sensor can be placed between an outer and middle pane, and between an inner and middle pane. In some examples, multiple sensors can be placed in a space between two glass panes. In some examples, a glass break detector circuit can apply logic using information from the two or more glass break sensor circuits to determine whether a glass break event has occurred. In some examples, a single glass break detector circuit can process information received from a number of sensors. In another example, multiple glass break detectors can communicate with each other, or with a master circuit, to combine sensed information and determine whether a glass break event has occurred.

Figure 3:
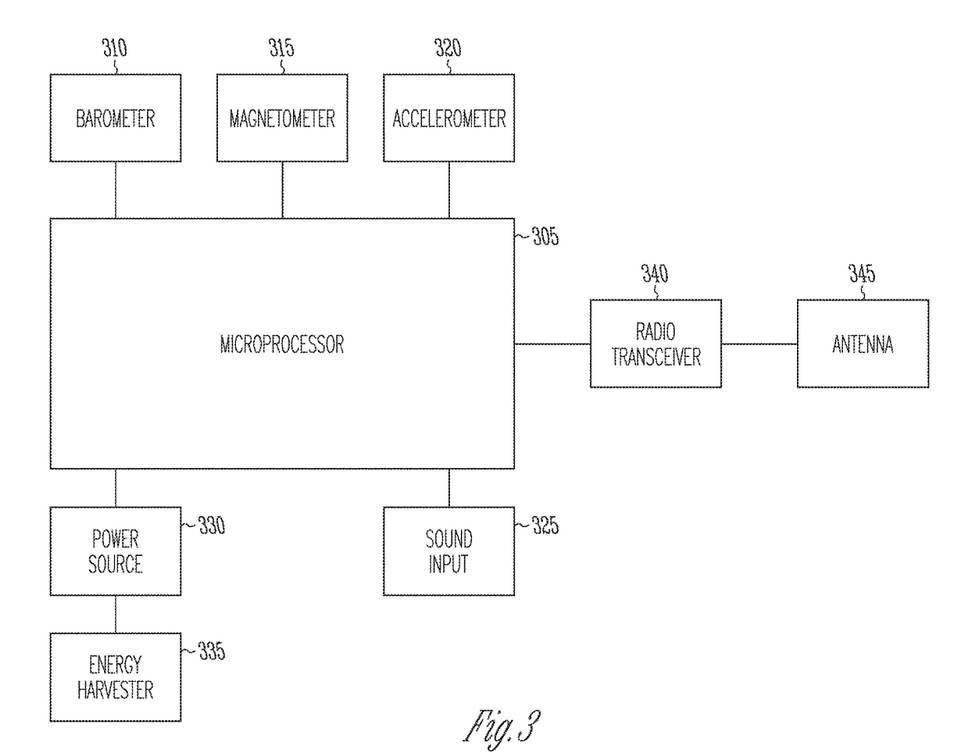
FIG. 3 is a block diagram of an example glass break detector 300.

FIG. 3 is a block diagram of an example glass break detector 300. A microprocessor 305 can be coupled to one or more sensors. While one microprocessor is shown, configurations with multiple microprocessors are possible, as described below in reference to FIG. 4. The glass break detector 300 can include one or more sensors that can be operatively coupled via wired or wireless connections to the microprocessor. For example, the glass break detector 300 can include one or more of a barometer 310 to sense pressure and pressure changes, a magnetometer 315 to detect magnetic fields and field changes, an accelerometer 320 to detect acceleration from motion, and a sound input 325, i.e. acoustic sensor, to detect sound waves. The glass break detector can also include a power source 330, such as a battery. The battery can, for example, include a "coin" or "button" form factor battery, or a AAA type battery integrated into a battery bay. The batteries can be rechargeable, replaceable, or both. Alternative current (AC) power sources are also possible, but practically less convenient. The glass break detector 300 can also include an energy harvester 335, such as a solar cell, or mechanical energy harvester. The glass break detector 300 can also include a radio transceiver 340 coupled to antenna 345 to enable the glass break to detector to send a wireless signal, e.g. WiFi, Bluetooth, or Zigbee, to a supporting system such as an alarm system, home security hub, or mobile device (e.g., smart phone.)

Figure 4:
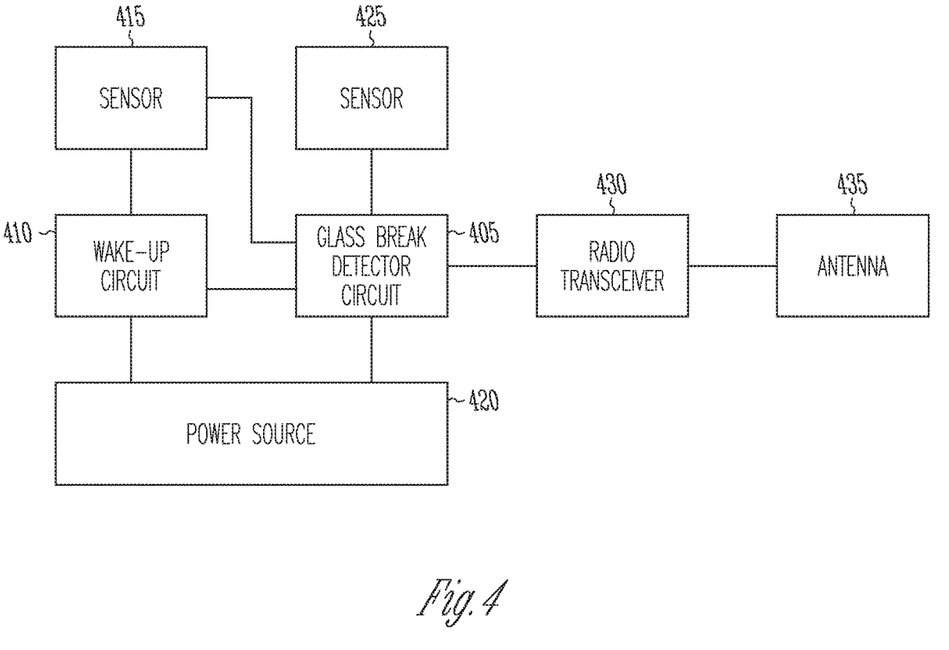
FIG. 4 is a block diagram of an example glass break detector that includes a low power wake-up circuit and a glass break detector circuit.

FIG. 4 is a block diagram of an example glass break detector 400 that includes a low power wake-up circuit 410 and a glass break detector circuit 405. A sensor 415 can be coupled to the wake-up circuit 410. The sensor 415 can be an acoustic (sound) sensor, a barometric (pressure) sensor, an accelerometer, a magnetometer, or another type of sensor.

In an example where the sensor 415 is a barometric senor, the sensor 415 can be a barometric sensor that detects a pressure change and sends a pressure change signal to the wake-up circuit that receives the signal. When the pressure change signal exceeds a threshold, the wake-up circuit wakes up the glass break detector circuit 410, or one or more sensor circuits. For example, a wake-up circuit can initiate activity by the glass break detector circuit 410 to activate or otherwise control one or more sensor circuits, gather incoming sensor information from the sensor circuits, or process the incoming or recently received sensor information to assess whether a glass break event is occurring or recently occurred.

The wake-up circuit 405 and glass break circuit 410 can both be powered by the same power source 420, such as a rechargeable battery that can optionally be coupled to an energy harvesting circuit (not shown in FIG. 4), such as a solar cell or mechanical energy harvester. In an alternative configuration, the wake-up circuit and glass break detector circuit can each be powered by their own power source (not shown), such as separate dedicated batteries, with life cycle and power delivery characteristics tailored to the power requirements of the respective circuits.

In some examples, configuring a glass break detector 400 with separate glass break detector circuit 410 and wake-up circuit 405 can provide longevity advantages, as the glass break detector circuit tends to involve more processing activity and greater power consumption than the wake-up circuit, which can be configured to consume very low power.

The glass break detector circuit 410 can be coupled to a sensor 425. The sensor can be an acoustic (sound) sensor, a barometric (pressure) sensor, an accelerometer, a magnetometer, or other types of sensors. In some examples, multiple sensors can be coupled to the glass break detector circuit. The glass break detector can execute instructions to process information from the sensor 425, and optionally additionally from the sensor 415 or other sensors, to determine whether a glass break event is occurring or has recently occurred.

The glass break detector circuit 410 can be coupled to a radio transceiver 430 that can be coupled to an antenna 435. In an example, when the glass break detector circuit declares 410 a glass break event, it can send a signal through the radio transceiver 430 and the antenna 435 to alert a security system, hub, mobile device (not shown) or other system or device to provide a notification that a glass break event has occurred.

Figure 5:
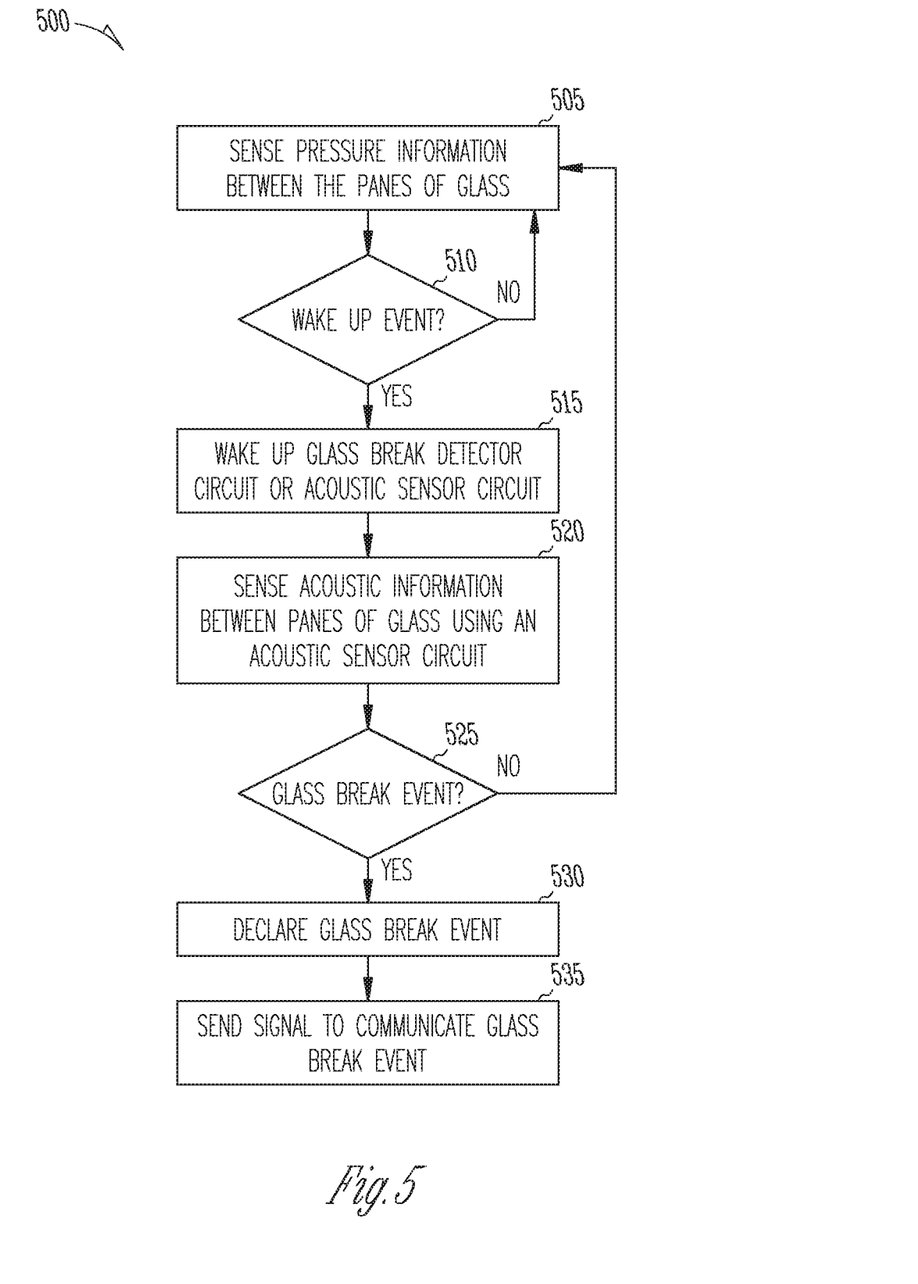
FIG. 5 is a flow chart that illustrates an example method that includes detecting a glass break event.

FIG. 5 is a flow chart that illustrates an example method 500 that includes detecting a glass break event. At step 505, information is sensed between glass panes. The sensing can include, for example, sensing information using any of the sensors and techniques described above, such as detecting ambient information between the glass panes using an acoustic (sound) sensor, a barometric (pressure) sensor, an accelerometer, a magnetometer, or other sensors. Information can also optionally be sensed from other locations on a glass not between the panes of glass, such as from an accelerometer or magnetometer mounted on a window frame. At step 510, a processor executes instructions to assess whether predetermined wake-up criteria have been satisfied. In some examples, the processor can adapt the wake-up criteria over time based on a history or pattern of sensed information, which can, for example, increase the sensitivity of the sensor of the criteria based on time of day (e.g. more sensitive at night), or raise or lower thresholds based on the occurrence of near-threshold activity that did not result in a glass break event.

If a wake-up event is not detected, the process returns to step 505 and continues monitoring sensor information. If a wake-up event is detected, a glass break detection circuit or acoustic sensor circuit (or both) is activated at step 515.

Additional information is optionally detected at step 520. Alternatively or additionally, previously-collected information is retried from a memory, such as the information that triggered the wake-up event or other sensor information collected shortly before or after or coincident with the wake-up event.

At 525, the information collected from sensors between the glass panes is evaluated against glass break criteria to assess whether a glass break event has occurred. In an example, a processor receives incoming information from a sensor, retrieves sensor information from a memory circuit, or both, and executes instructions to determine whether glass break criteria, such as the various criteria discussed above (e.g., a sound over a threshold or series or sequence of sounds satisfying threshold and frequency range criteria, or a pressure change, light change, acceleration, and magnetic field change). If a glass break event has not occurred, an event is not declared, and the glass break detection circuit deactivates, i.e. goes back to a low-power "sleep" mode, and the process returns to step 505. In some examples, the process 500 optionally first returns to step 520 and cycles through a detection—evaluation process for a defined period of time or number of cycles or or until sensed ambient activity falls below a predetermined threshold, and then eventually returns to step 505, and returns the detection circuit to sleep mode, if a glass break event is not detected.

If a glass break event is detected, the process moves to step 530 and a glass break event is declared. At step 535, a signal is sent to communicate the glass break event. In various examples, a wireless or wired communication is sent, a sound is emitted, or a light is emitted. In some examples, responsive action such as activation of a camera, auto-locking of doors, or activation of a security system is initiated.

Figure 6:
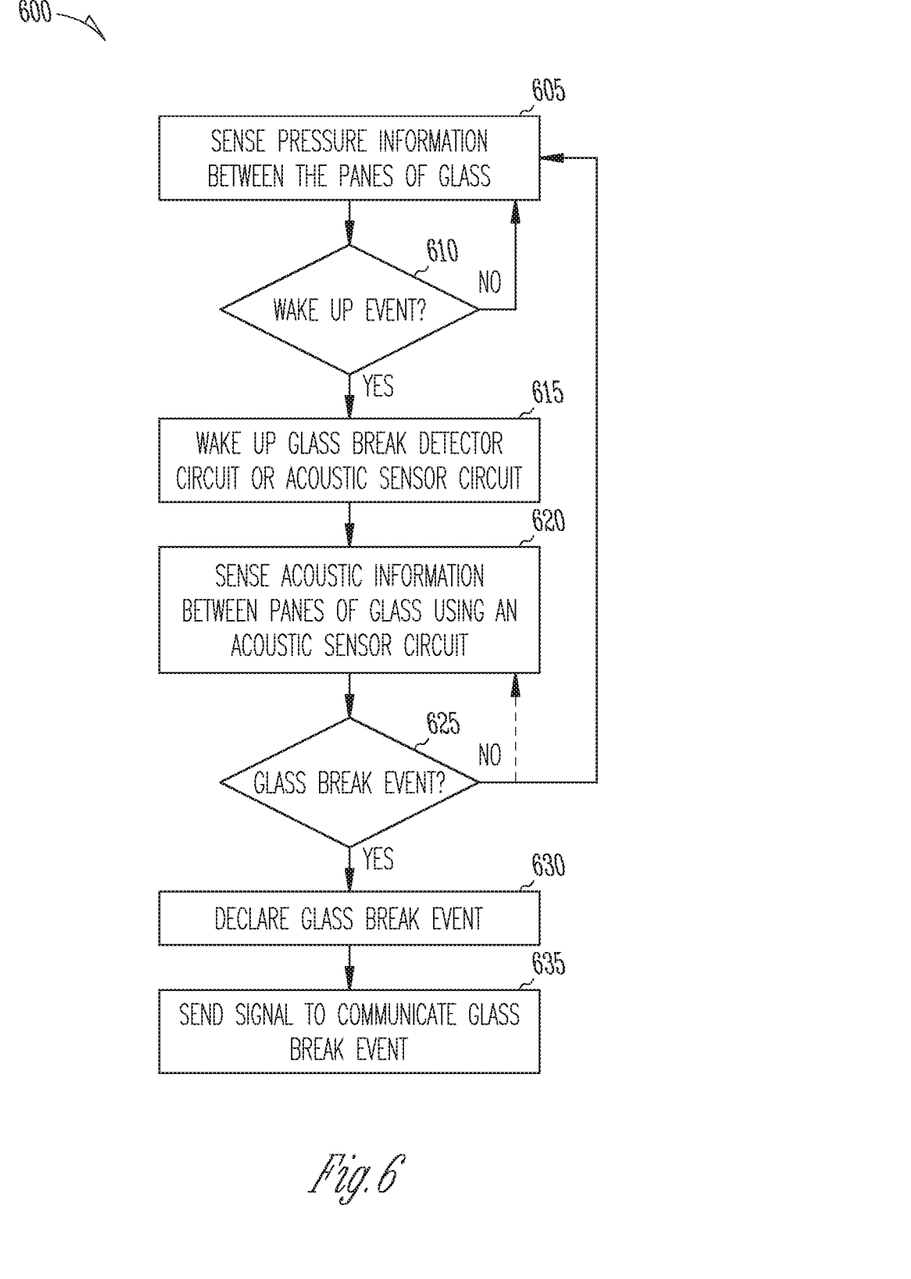
FIG. 6 is a flow chart illustration of an example method that uses pressure information and acoustic information.

FIG. 6 is a flow chart illustration of an example method that uses pressure information and acoustic information. At 605, pressure information is sensed between panes of glass, such as between panes of a glass window. At step 610, sensed pressure information is evaluated to assess whether one or more wake-up criteria have been satisfied. The wake-up criteria can include, for example, a shift in pressure that exceeds a threshold, or a pressure reading that exceeds a threshold (high pressure) or falls below a threshold (low pressure.) At 615, a glass break detector circuit or acoustic sensor circuit or both are awakened, i.e. activated from a low power state to a high power state in which information can be gathered and processed. At 620, acoustic information is sensed between panes of glass, using an acoustic sensor circuit. The method can be particularly effective between panes of glass because of the sound-filtering properties of glass, which can enable increased sensitivity and specificity of glass-break detection using the glass-break criteria.

At 625, sensed acoustic information is evaluated against predetermined glass-break criteria. Step 625 can optionally include evaluation of pressure information or other sensed information, in combination with acoustic information. If a glass-break event is not detected, the process returns to step 605 and the glass break detector circuit is deactivated. Similar to the discussion with respect to FIG. 5, the process can optionally include assessment of sensed information against the glass break criteria for a defined period of time or number of cycles or until sensed information falls below a threshold (e.g. sounds diminish), before deactivating the detector circuit. When a glass break event is detected, a glass break event is declared in the detector circuit, and a signal, such as a sound, light, wired, or wireless signal is sent to communicate the glass break event to a security system, person, or to an intruder. The methods 500 and 600 of can be combined to provide various example methods using the variety of sensors and techniques discussed above.

The various devices and techniques described above can be combined with a glass break detector that is not situated between panes of glass. For example, a glass break detector can be mounted or adhered to a window or window frame using an adhesive or other physical connection.

The various methods and devices described above can be utilized to provide a combined door and window sensor in a door that has a window. For example, combined door and window detection system can include an accelerometer or magnetometer that can detect movement of a door, indicating that it has been opened or broken, and a glass break detector as described above, which can include, for example, an acoustic sensor or other sensors situated between the panes in the widow and configured to detect breaking of a window pane.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can optionally include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can optionally include a computer-readable medium or machine-readable medium encoded with instructions operable to configure an electronic device to perform methods as described in the above examples. An implementation of such methods can optionally include code, such as microcode, assembly language code, a higher-level language code, or the like. Such code can optionally include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can optionally include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permuta- The claimed invention is:

1. A glass break detector assembly comprising:
   a multi-pane window assembly including a first pane and a second pane; and
   a glass break sensor in an open space defined by opposed surfaces of the first pane and the second pane, wherein the glass break sensor is configured to detect a pressure change in the open space.

2. The glass break detector assembly of claim 1, further comprising a wake-up circuit configured to process input from the glass break sensor and initiate a detector circuit when one or more specified wake-up criteria are satisfied.

3. The glass break detector assembly of claim 2, wherein the one or more specified wake-up criteria include detection of a sound that has a frequency within a specified frequency range and has an amplitude that exceeds a threshold.

4. The glass break detector assembly of claim 2, wherein the one or more specified wake-up criteria include detection of an acceleration.

5. The glass break detector assembly of claim 2, wherein the one or more specified wake-up criteria include detection of a pressure change in the space defined by the opposed surfaces of the first pane and the second pane.

6. The glass break detector assembly of claim 1, further comprising a detector circuit configured to declare a glass break event when one or more glass-break criteria are satisfied.

7. The glass break detector assembly of claim 6, wherein the glass break sensor includes a sound detector and the one or more glass-break criteria include a first sound having a first frequency within a first frequency range and an amplitude exceeding a first threshold, followed by a second sound having a second frequency range and an amplitude exceeding a second threshold.

8. The glass break detector assembly of claim 7, wherein the second frequency range is higher than the first frequency range.

9. The glass break detector assembly of claim 7, wherein the glass break sensor further includes a pressure sensor, and the one or more glass-break criteria include a pressure change that exceeds a threshold.

10. The glass break detector assembly of claim 7, wherein the glass break sensor further includes an accelerometer, and the one or more glass-break criteria further include an acceleration that exceeds a threshold.

11. The glass break detector assembly of claim 6, further including a solar cell and a rechargeable battery coupled to the solar cell and configured to power the detector circuit.

12. The glass break detector assembly of claim 6, further including a battery bay configured to receive one or more batteries, the battery bay electrically coupled to the detector circuit and configured to power the detector circuit.

13. The glass break detector assembly of claim 1, further comprising a communication circuit configured to communicate glass break information over a wireless network.

14. The glass break detector assembly of claim 1, wherein the first pane and second pane are part of a microwave oven, and the glass break sensor is configured to detect an event in the microwave oven.

15. A glass break detector comprising:
    a sensor unit sized and shaped to fit in a space defined by opposed planar surfaces of first and second panes of glass of a multi-plane window assembly, the sensor unit including:
    one or more sensors, the one or more sensors including a pressure sensor configured to detect a pressure change in the open space and an acoustic sensor;
    a glass break detector circuit configured to receive input from at least one of the one or more sensors and declare a glass break event when specified criteria are satisfied; and
    a wake-up circuit configured to detect a wake-up event and wake up the glass break detector circuit when one or more wake up criteria are satisfied.

16. The glass break detector of claim 15, wherein the glass break detector circuit is configured to declare a glass break event using both input from the acoustic sensor and input from the pressure sensor.

17. The glass break detector of claim 15, wherein the sensor unit further comprises a rechargeable battery configured to power the glass break detector circuit and the wake-up circuit, and a solar cell configured to charge the rechargeable battery.

18. The glass break detector of claim 15, further comprising a lower-power communication circuit configured to communicate a glass break event over a wireless network.

19. A method of detecting a glass break event comprising:
    sensing pressure in a space defined by opposed surfaces of panes of glass using a first sensor circuit to obtain first sensed information;
    waking an evaluation circuit based at least in part on the sensed pressure information;
    sensing acoustic information using an acoustic sensor;
    evaluating the sensed acoustic information using an evaluation circuit; and
    declaring a glass break event when the sensed acoustic information satisfies one or more specified criteria.

20. The method of claim 19, wherein the evaluating includes evaluating the sensed acoustic information in combination with the pressure information.

21. The glass break detector of claim 15, wherein the one or more wake up criteria are based at least in part on a pressure change detected by the pressure sensor.

* * * * *

UNITED STATES PATENT AND TRADEMARK OFFICE
CERTIFICATE OF CORRECTION

PATENT NO. : 10,089,851 B1
APPLICATION NO. : 15/471769
DATED : October 2, 2018
INVENTOR(S) : Inderjit Singh Page 1 of 1

It is certified that error appears in the above-identified patent and that said Letters Patent is hereby corrected as shown below:

On the Title Page

Item (22), in "Filed", in Column 1, Line 1, after "2017", insert --¶ (65) Prior Publication Data US 2018/0286209 A1 Oct. 04, 2018--

In the Claims

In Column 12, Line 13, in Claim 15, delete "multi-plane" and insert --multi-pane-- therefor Signed and Sealed this
Eleventh Day of June, 2019

Andrei Iancu
*Director of the United States Patent and Trademark Office*